US009919258B2

(12) United States Patent
Monereau et al.

(10) Patent No.: US 9,919,258 B2
(45) Date of Patent: Mar. 20, 2018

(54) PRESSURE SWING ADSORPTION METHOD WITH ADDITIONAL ELUTION

(71) Applicant: L'Air Liquide, Société Anonyme pour l'Etude et l'Exploitation des Procédés Georges Claude, Paris (FR)

(72) Inventors: Christian Monereau, Montpellier (FR); Yann-Pierrick Lemaire, Verrières (FR); Elise Renou, Paris (FR); Louis Toulemonde, Douai (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 57 days.

(21) Appl. No.: 15/027,208

(22) PCT Filed: Sep. 30, 2014

(86) PCT No.: PCT/FR2014/052458
§ 371 (c)(1),
(2) Date: Apr. 4, 2016

(87) PCT Pub. No.: WO2015/049452
PCT Pub. Date: Apr. 9, 2015

(65) Prior Publication Data
US 2016/0236134 A1 Aug. 18, 2016

(30) Foreign Application Priority Data
Oct. 4, 2013 (FR) ...................................... 13 59624

(51) Int. Cl.
*B01D 53/047* (2006.01)
*C01B 3/56* (2006.01)

(52) U.S. Cl.
CPC .............. *B01D 53/047* (2013.01); *C01B 3/56* (2013.01); *B01D 2256/16* (2013.01); *B01D 2256/22* (2013.01); *B01D 2258/0283* (2013.01); *B01D 2259/40039* (2013.01); *B01D 2259/40043* (2013.01); *B01D 2259/40052* (2013.01); *B01D 2259/40062* (2013.01)

(58) Field of Classification Search
CPC .............. B01D 53/047; B01D 2256/16; B01D 2256/22; B01D 2257/504; B01D 2258/0283; B01D 2259/40039; B01D 2259/40052; B01D 2259/40062; B01D 2259/40043; C01B 3/56
USPC ........................ 95/96–98, 100, 103, 116, 139
See application file for complete search history.

(56) References Cited

U.S. PATENT DOCUMENTS

| 3,703,068 A | 1/1972 | Wagner | |
|---|---|---|---|
| 4,315,759 A * | 2/1982 | Benkmann | B01D 53/047 95/23 |
| 4,475,930 A * | 10/1984 | Asztalos | B01D 53/047 95/98 |
| 4,693,730 A | 9/1987 | Miller et al. | |
| 4,705,541 A * | 11/1987 | Sircar | B01D 53/047 95/130 |
| 5,407,465 A | 4/1995 | Schaub et al. | |
| 5,997,612 A * | 12/1999 | Doong | B01D 53/047 95/101 |
| 6,132,496 A | 10/2000 | Petit et al. | |
| 2005/0098034 A1* | 5/2005 | Gittleman | B01D 53/047 95/96 |
| 2006/0288867 A1* | 12/2006 | Herb | B01D 53/047 95/96 |
| 2008/0202337 A1* | 8/2008 | Taylor | B01D 53/0476 95/101 |

FOREIGN PATENT DOCUMENTS

| EP | 0 271 356 A2 | 6/1988 |
|---|---|---|
| EP | 0 884 088 A1 | 12/1998 |
| EP | 0 988 882 A2 | 3/2000 |
| EP | 1 018 359 A2 | 7/2000 |
| EP | 1 114 666 A2 | 7/2001 |
| FR | 2 892 322 A1 | 4/2007 |
| FR | 2892322 * | 4/2007 |

OTHER PUBLICATIONS

Ruthven, D. M, et al.; Chapter 6, 6.1.4, "Purge Flow Rate", Pressure Swing Adsorption; 1994, pp. 224-226, VHC Publishing, Inc., NY, NY.
Waldron, W. E., et al.; Parametric Study of a Pressure Swing Adsorption Process; Adsorption Jun. 2000, pp. 179-188. vol. 6, Issue 2; Kluwer Academic Publishers, The Netherlands.
International Search Report and Written Opinion for PCT/FR2014/052488 dated Jul. 1, 2015 (French).
International Search Report and Written Opinion for PCT/FR2014/052488 dated Jul. 1, 2015 (English machine translation).
International Search Report and Written Opinion for PCT/FR2014/052458 dated Dec. 16, 2014 (French).
International Search Report and Written Opinion for PCT/FR2014/052458 dated Dec. 16, 2014 (English machine translation).

* cited by examiner

*Primary Examiner* — Frank Lawrence
(74) *Attorney, Agent, or Firm* — Elwood L. Haynes

(57) ABSTRACT

A pressure swing adsorption process for producing a gas stream enriched in a compound X from a feed gas stream is provided. The process includes at least 2 adsorbers, with each adsorber being subjected to a pressure cycle having a high pressure and a low pressure. The process includes adsorption at the high pressure with production of the gas stream enriched in compound X; then depressurization; then elution at the low pressure; and finally repressurization to the high pressure. The elution gas is made up fractions of gas stream resulting from the depressurization of an adsorber and the gas stream enriched in compound X. The pressure cycle has a phase time corresponding to the duration of a pressure cycle divided by the number of adsorbers and the fraction of the gas stream enriched in compound X is determined as a function of the phase time.

10 Claims, 1 Drawing Sheet

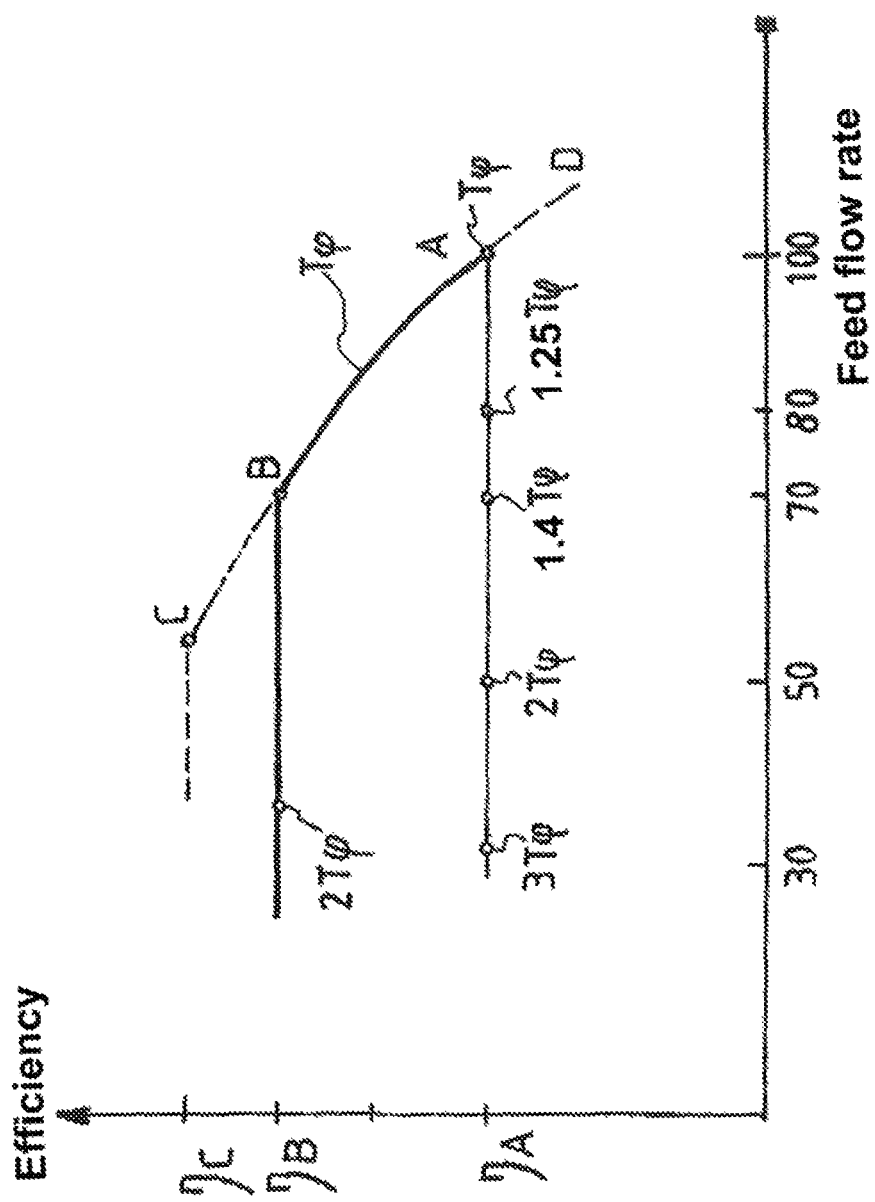

PRESSURE SWING ADSORPTION METHOD WITH ADDITIONAL ELUTION

CROSS REFERENCE TO RELATED APPLICATIONS

This application is a 371 of International PCT Application PCT/FR2014/052458 filed Sep. 30, 2014, which claims priority to French Patent Application No. 1359624 filed Oct. 4, 2013, the entire contents of which are incorporated herein by reference.

BACKGROUND

The present invention relates to a process for treating a gas by adsorption, of the type in which use is made of a pressure swing adsorption treatment unit, commonly referred to as a PSA unit, and in which said unit is regulated via the elution gas.

PSA units are commonly used for the separation and/or purification of feed gas, especially in the fields of producing hydrogen and carbon dioxide, of drying, of separating the constituents of air, etc.

"PSA-H2" units which produce substantially pure hydrogen are used with feed gases of varied origin, formed for example from gases resulting from steam reforming, refinery gases or coke-oven gases, or else formed from waste gases from ethylene or styrene production units, or from cryogenic hydrogen-carbon monoxide separation units.

Generally, a PSA unit consists of several adsorbers which follow, with a time lag, an operating cycle, subsequently referred to for convenience as a "PSA cycle", which is uniformly distributed over as many phase times as there are adsorbers in operation, and which is formed from basic steps, namely the steps of:
  adsorption at substantially a high pressure of the cycle;
  co-current depressurization, generally from the high pressure of the cycle;
  counter-current depressurization, generally from the low pressure of the cycle;
  elution at substantially a low pressure of the cycle; and
  repressurization, from the low pressure of the cycle to the high pressure of the cycle.

Hereafter, the description relates to the operation of a PSA unit in the steady state, i.e. outside of transient periods during which the unit is started up or shut down, which generally correspond to special cycles set up for this purpose.

The main operating constraint of a PSA unit in the steady state consists of the degree of purity of the product. Under this operating condition, the treatment performance level of a PSA unit are then generally optimized either in order to maximize the extraction efficiency (amount of gas produced/amount of this gas present in the feed gas), or in order to minimize the energy consumed.

Obtained in this way is a nominal operating cycle of the PSA unit, which is determined directly as a function of the nominal operating conditions (flow rate of the feed gas, flow rate of the treated gas, composition of the feed gas, operating temperature of the unit, etc.).

When the operating conditions depart only slightly from the nominal conditions, it has been proposed in the past to regulate the operation of the PSA unit by adjusting one or more parameters of the nominal cycle so as to guarantee that the treatment performance levels remain above predefined minimum limits. Two regulations that come under this approach are:

"capacity" regulation, which consists in modifying the duration of the phase time of the cycle as a function of the variation in the feed gas flow rate; and "purity control" regulation, which consists in modifying the phase time as a function of the purity of the treated gas.

It is advisable here to define what is understood by cycle time and phase time (or more simply phase).

As has been described above, an adsorber will therefore begin an adsorption period until it is loaded with the constituent(s) to be stopped at the high pressure, then will be regenerated by depressurization and extraction of the adsorbed compounds before being restored in order to restart a new adsorption period. The adsorber has then carried out a "pressure cycle" and the very principle of the PSA process is to link these cycles together one after the other; it is therefore a cyclic process. The time that an adsorber takes to return to its initial state is referred to as the cycle time. In principle, each adsorber follows the same cycle with a time lag that is referred to as the phase time or more simply the phase. The following relationship therefore exists:

Phase time=cycle time/number of adsorbers and it is seen that the number of phases is equal to the number of adsorbers.

There may be any number N of adsorbers, but generally N is between 2 and 32, more typically between 4 and 16.

Ultimately, under stabilized operation, assumed here to be at reduced feed flow rate, a production having the required purity and the nominal efficiency of the cycle used is obtained.

Nevertheless, the fact remains that the unit operating under these new conditions is overdesigned with respect to a design which would have been made specifically regarding this case. The amortization of the initial investment comes down to a lower hydrogen production and the specific cost is therefore higher. Over long operating periods of the unit, this operation is economically poor.

SUMMARY

The objective of the invention is to take advantage of this overdesign in order to improve the economic conditions of the production, in particular by increasing the extraction efficiency, i.e. by producing more marketable hydrogen if it is the feed flow rate which is limited for some reason or by reducing the amount of feed gas necessary and thereby, for example, the amount of natural gas consumed in order to generate the syngas produced via an SMR, if the production is fixed.

One solution of the present invention is a pressure swing adsorption (PSA) process for producing a gas stream enriched in a compound X from a feed gas stream, using at least 2 adsorbers, each adsorber being subjected to a pressure cycle having a high pressure and a low pressure and comprising the following successive steps:
  a) adsorption at the high pressure of the cycle with production of the gas stream enriched in compound X
  b) depressurization to the low pressure of the cycle
  c) elution at the low pressure by means of an elution gas
  d) repressurization to the high pressure characterized in that:
    the elution gas comprises a fraction of a gas stream resulting from the depressurization of an adsorber and a fraction of the gas stream enriched in compound X, and
    said fraction of the gas stream enriched in compound X is adjustable via adjustment means.

Depending on the case, the process according to the invention may have one or more of the following characteristics:
- the fraction of the gas stream enriched in compound X is adjusted as a function of at least one of the operating conditions of the PSA;
- the operating conditions include the feed flow rate of the PSA, the low pressure, the high pressure, the temperature of the feed stream, the composition of the gaseous feed stream and the required concentration of compound X in the enriched gas stream, and the required flow rate of the gas stream enriched in compound X;
- the pressure cycle has a phase time corresponding to the duration of a pressure cycle divided by the number of adsorbers and the fraction of the gas stream enriched in compound X is determined as a function of the phase time;
- the pressure cycle has a phase time corresponding to the duration of the pressure cycle divided by the number of adsorbers and the fraction of the gas stream enriched in compound X is selected so that the phase time corresponds to the nominal phase time ±5%, the nominal phase time corresponding to the phase time of the PSA under the design conditions;
- the adjustment means comprise an automatic valve;
- the automatic valve also performs another function in the PSA cycle;
- the pressure cycle comprises from 1 to 6 equalizations, preferably from 2 to 5;
- the depressurization step b) comprises several sub-steps and the fraction of the gas stream resulting from the depressurization is withdrawn at the same time as or at least partially with another sub-step;
- the fraction of the gas stream enriched in compound X is withdrawn throughout the duration of a phase time;
- the compound X is hydrogen or $CO_2$.

The "nominal conditions" may be defined as all of the conditions set by the client that determine the design of the unit and the performance thereof.

For a $H_2$-PSA for example, the composition of the feed gas, the purity required for the $H_2$, the production flow rate, the feed gas pressure, the production pressure (or the maximum pressure drop across a unit) and the minimum pressure for the waste gas will be thought of. Other conditions may be added to these main parameters, which other conditions will lead to optionally having to overdesign certain equipment (maximum fluctuation of the composition of the regeneration gas possibly determining the size of the waste gas capacity for example). It should be noted that a minimum $H_2$ extraction efficiency may be among the design data: it will then set the minimum number of equalizations to be provided in the determination of the cycle of the PSA. Instead of a precise composition of the feed gas, composition ranges for each constituent may be indicated. It is then the responsibility of the person doing the design to determine the most restrictive composition for the PSA.

The invention will now be described in greater detail using the following two cases, the first corresponding to an $H_2$-PSA unit standard as regards the cycle and the basic regulation, the second being according to the invention.

By way of example and nonlimitingly, an 8.1.3 PSA cycle is chosen, i.e. one with 8 adsorbers, only one in production at the same time and 3 pressure equalizations.

The representation used below consists, during the time of one phase, in demonstrating the situation of the 8 adsorbers.

It is then possible, if necessary, to construct the complete cycle by supplementing each line with the following steps.

TABLE 1

| Ads | Ads | Ads |
|---|---|---|
| Ed1 | I | Ed2 |
| Ed3 (dp = 1 bar) | I | PP |
| PP | PP | BD |
| P | P | P |
| P | P | P |
| Eup3 | I | Eup2 |
| Eup1 + Rep | Rep | Rep |

In practice, when an adsorber has finished its production phase at the High Pressure of the cycle (Ads), it is depressurized by the pressure equalizations Ed1 and Ed2 (separated by a dead time I), then via a $3^{rd}$ equalization Ed3, followed by a dead time and a first purge-providing (PP) step. The next phase consists of two supplementary purge-providing steps, so that elution gas is produced over the complete duration of one phase, and of a counter-current blowdown step. The next two phases are dedicated to the elution step. It will be noted that a single elution phase would be sufficient to obtain a PSA cycle which works but too short a duration for the elution and higher pressure drops would be harmful to the performance of the PSA. The next phase corresponds to the equalizations at increasing pressure Eup 3 and 2 and the last phase consists of the last equalization Eup1 and of the final repressurization by the production (it is also possible to repressurize via the feed gas). It will be noted that it has been chosen to repressurize throughout the duration of the phase, therefore simultaneously with the first equalization, in order to ensure a constant production flow rate. This slowly limits the gas recovered during the first equalization (Ed1) and thereby slightly reduces the $H_2$ extraction efficiency.

Specifically, it is known that for $H_2$-PSAs at least, increasing the number of equalizations, a priori up to 4 or 5 if the high and low pressure conditions allow it as is the case customarily for the units treating a syngas originating for example from an SMR unit in the region of 25 to 30 bar abs and the waste gas of which is used at low pressure (around 1.3 bar abs) in order to supply the burners of the SMR, makes it possible to increase the $H_2$ extraction efficiency. This takes place to the detriment of the productivity.

This is furthermore confirmed by the publication: "Parametric Study of a Pressure Swing Adsorption Process", AIChE 1999, Annual Meeting, Dallas, regarding the production of high purity hydrogen from a feed gas formed from a binary methane-hydrogen mixture. The pressure cycles used are similar to those mentioned above. It is indicated that moving from 1 to 3 equalizations makes it possible to gain 2.5% regarding the efficiency but to the detriment of an increase of 40% in the volume of adsorbent.

The impact of the amount of elution gas, withdrawn during the purge-providing (PP) steps, on the performance of the process is also a known fact. For this purpose, it is conventional to use the P/F elution ratio which is the ratio (in actual cubic meters), i.e. under the pressure and temperature operating conditions, of the amount of elution gas used to the amount of feed gas introduced into the adsorber during the cycle. FIG. 2 from the aforementioned AIChE article shows that the optimum, whatever the cycle, is obtained for a ratio of 1.1 to 1.2.

In any case, the fact that the P/F ratio should be greater than 1 is not limited to $H_2$-PSAs. Thus, in the book "Pressure Swing Adsorption" by Ruthven, Farooq, Knaebel, this point is addressed, for example in the paragraph "Purge flow rate, Air drying, PSA Processes" from Chapter 6, where it is explained that for a PSA air dryer unit, a P/F ratio of 1.15 is recommended. A ratio of 1 makes it possible in theory to move back the impurities front to where it was before adsorption.

The determination of the elution ratio of an industrial or pilot unit may be carried out from the measurement of the feed and elution flow rates of the gas. It may also be determined from PSA process simulation software like that which was carried out in the AlChE article.

In recent $H_2$-PSAs, the elution gas originates from one or multiple purge-providing steps located during the blowdown, more particularly co-current blowdown. Although the production of elution gas often takes place after the last equalization and before the counter-current blowdown, as in our example, very many variants exist: step simultaneous with one or more equalizations, step inserted between 2 successive equalizations, simultaneous with the start of the counter-current blowdown, etc.

In older PSAs or for other types of separation, the elution gas may originate from the production, or even in some particular cases be a gas outside the unit.

Generally, the elution phase consists in facilitating the desorption of the impurities and cleaning the production side zone by "moving back the impurities front". Increasing the amount of elution gas will make it possible to better eliminate the impurities and therefore to require a smaller volume of adsorbent but this is to the detriment of the production since this consumes the least adsorbable gas.

As a function of the operating conditions and of the economic conditions, an economic optimum will be sought, regarding the nominal case, with the aid of tests or simulations, which economic optimum will correspond for example for an $H_2$-PSA to choosing the total number of adsorbers, the number simultaneously in adsorption mode, the number of equalizations, the P/F ratio and the nature of the elution gas.

For other working conditions, for example reduced operating conditions, use is made of the regulations described above which consists in modifying the phase time in order to maintain the desired purity.

According to the invention, the elution gas will be systematically split into at least two different sources. A first portion will come from the co-current depressurization of the adsorber (PP) whilst the second portion (PProd) will be withdrawn from the production.

Withdrawing less elution gas during the co-current depressurization, given the elution by the production, it is possible to carry out a more exhaustive equalization 3, i.e. in practice to keep the amount of gas equivalent in the system, and in that way to compensate for the loss of production by an increase in the efficiency via the equalizations.

The cycle below will for example be used:

TABLE 2

| Ads | Ads | Ads |
|---|---|---|
| Ed1 | I | Ed2 |
| Ed3 | I | PP |
| PP | PP | BD |
| P(PP) | P(PP) | P(PP) |
| P(Prod) | P(Prod) | P(Prod) |
| Eup3 | I | Eup2 |
| Eup1 + Rep | Rep | Rep |

At the nominal operating point, such a cycle, even though for the $H_2$-PSAs this is not a standard cycle, exhibits no particular innovation.

On other hand, this makes it possible to simply implement a regulation of a new type that makes it possible to respond to the problem posed, namely: to take advantage of an operation at reduced flow rate (feed limited in quantity or lower product gas demand) or of an operating point more favorable than the design point. A more favorable operating point is understood in particular to mean a parameter that will result in the productivity of the PSA being increased and that, at constant flow rate, will lead to an increase in the cycle time in order to maintain the purity of the production (and avoid too high a quality of the product to the detriment of the efficiency).

Generally, the phase time of a PSA is regulated via a relationship of the type:

$$Tph=TphN*(Dn/D)*K1*K2*K3*Ki \ldots *KM$$

where
Tph: actual phase time (for the phase in progress)
TphN: nominal (design) phase time
DN: nominal feed flow rate
D: actual flow rate
K1: $H_2$ purity coefficient
K2: operating conditions coefficient
K3: coefficient linked to the upstream or downstream periodic operations
Ki
KM: operator coefficient The first part of the formula $Tph=TphN*(Dn/D)$ consists in adapting the phase time to the flow rate to be treated. As already mentioned, this enables the adsorbent to treat the same amount of feed gas during each phase. Use is generally made of $Nm^3$ in order to take into account the flow rates via flowmeters corrected in terms of pressure, temperature and if necessary density, the latter optionally determined by analysis.

The coefficient K1 is the correction coefficient linked to the purity. It must lead to shortening the phase time in the case of a risk of loss of purity and to lengthening it in the case of too high a quality. As for all the parameters, there are several ways of integrating the purity of the hydrogen into the phase time calculation. The example below describes one thereof, nonlimitingly, for an acceptable impurity threshold (purity spec: 10 ppm).

TABLE 3

| Purity threshold | <5 ppm | between 5 ppm and 8 ppm | between 8 ppm and 10 ppm | between 10 ppm and 11 ppm | <11 ppm |
|---|---|---|---|---|---|
| K1 | 1.02 | 1.01 | 1.0 | 0.98 | 0.95 |

In practice, there is no correction between 8 and 10 ppm of measured impurity (K1=1.0). There is more correction in the case of pollution (0.98/0.95) than in the case of too high a purity (1.01/1.02).

Optionally added to that are temporizations corresponding for example to a complete cycle time.

The correction may relate to the phase time to come or optionally to that in progress if the process allows it.

This regulation may be rendered inoperative by the decision of an operator, like for that matter the majority of the corrections.

The coefficient K2 is linked to an operating parameter of the PSA measured continuously or semi-continuously, capable of varying over time. This may be, still by way of nonlimiting example, the content of nitrogen in the feed gas or the low regeneration pressure. Via simulation, or tests, the influence of this parameter on the performance of the PSA, in particular on the productivity and thereby on the phase time, is known.

Such a correction makes it possible to immediately adapt the phase time to the new operating conditions without waiting for the purity of the hydrogen not to vary, which may take a certain number of cycles. Even if the correction is not perfect, this limits the variations of the $H_2$ purity.

The coefficient K3, if it exists, takes into account the operation of upstream or downstream units that have an impact on the operation of the PSA. An example corresponds to the case where the feed flow rate of the PSA is used periodically to regenerate another unit for treating gas by adsorption. At a given moment and for a known period, the feed gas will see its composition change, for example in the case of an $H_2$-PSA, the feed flow rate of which is used to regenerate a syngas dryer, to have a higher content of CO. Here too, the idea is to take the initiative and to immediately correct the phase time over a given time.

Lastly, KM is the operator correction. It is generally used after having put out of service the regulation regarding the purity. In order to have a large margin regarding the purity of the production over a period where there is a risk for example of perturbations, the operator decides to shorten the phase time in order to ensure the purity even to the detriment of the extraction efficiency.

As is seen, this type of regulation, already produced, makes it possible to maintain both the required purity and the efficiency. For the PSA it leads to a longer phase time than the nominal phase time being adopted since the operating conditions are more favorable.

It will also be noted:
that it may be possible, if the design allows it, to shorten the phase time in order to be able to treat a greater flow rate even if it means losing a little efficiency in such an operation.
that all the parameters and coefficients are provided in order to remain within defined ranges with various alarms and optionally safety measures.

The regulation according to the invention for its part will make it possible to benefit from the difference in the recalculated phase time and the nominal phase time in order to increase the performance of the PSA, in particular the extraction efficiency.

As for the basic regulation, there are many ways of implementing this new regulation. The simplest way of illustrating it is to start again from the conventional regulation described above.

Let it be assumed that the result of the calculation leads to Tph=1.18 TphN.

In such a case, it will be possible to reduce the amount of elution gas originating from the production, which will lead to the adsorbent being regenerated less well and thereby to the productivity being reduced.

Under the same feed conditions, it will therefore be necessary to accelerate the phase time in order to compensate for this provoked reduction in the productivity.

Via simulations, or tests, it is advisable to establish the relationship between productivity and elution quantity. By integrating this modification into the regulation loop, it will be possible to retain a phase time equal or similar to TphN even in a case of more favorable operation and to produce more.

This regulation may optionally play out until the elution is totally suppressed by the production. Beyond that, it is advisable to return to a standard regulation, that is to say to increase the phase time.

In practice, this may result for example in the addition of 2 tests: Tph>TphN and PProd>0 with, in the case of a positive response, an action on the amount of elution gas of the type: QPProd i+1=f (Tph, QPProd i) automatically modifying the elution flow rate or directly modifying the opening of the valve regulating the flow rate.

Compared to this type of regulation where each factor acts as it were separately and in which the final set point is the result of a multiplication of calculations and/or corrections, regulations exist where all of the data are treated simultaneously via one or more algorithms giving in response the characteristics of the regulation (phase time, opening of the valves, etc.).

The invention is therefore characterized by the fact that the PSA unit comprises a low-pressure elution step carried out by means of an elution gas originating partly from at least one adsorber in co-current depressurization phase (standard purge-providing step) and partly from the production, this second amount being adapted to the operating conditions in order to optimize the extraction efficiency.

More particularly, the elution fraction coming from the production is adapted as a function of the operating conditions in order to maintain the phase time at its nominal value or close to the nominal value. What is understood by operating conditions will be returned to later.

This type of regulation applies, a priori, to all types of PSA and more particularly to $H_2$-PSAs.

BRIEF DESCRIPTION OF THE DRAWING

For a further understanding of the nature and objects for the present invention, reference should be made to the following detailed description, taken in conjunction with the accompanying drawing, in which like elements are given the same or analogous reference numbers and wherein:

FIG. 1 illustrates the difference between the standard regulation and the regulation according to the invention.

DESCRIPTION OF PREFERRED EMBODIMENTS

The design point of the PSA is point A of the graph. For the nominal flow rate of feed gas (100), the PSA unit has been optimized with a minimum phase time Tφ—in order to have the minimum volume of adsorbent—and for the required extraction efficiency ηA.

It is not necessary here to go back into detail of the determination of the optimal phase time which may be based on the minimal duration required for a step (owing to the adsorption kinetics, pressure drops, etc.) or on a series of steps that have to keep within a phase time.

The elution gas thus originates on the one hand from a co-current depressurization step and on the other hand from the production. The conventional regulation will make it possible to maintain the nominal efficiency ηA by increasing the phase time in inverse proportion to the reduction of the feed flow rate. Thus at 80% of the nominal flow rate, the phase time will correspond to 1.25 Tφ, at 50% to 2 Tφ, at 33% to 3 Tφ.

The new regulation according to the invention corresponds to the thick line from the same FIG. 1.

The overdesign of the PSA is taken advantage of relative to the design point brought about by the reduction in flow rate in order to use a cycle of lower productivity and of higher efficiency. In order to do this, the amount of elution gas originating from the production is reduced. The curve AB of the graph is moved over at constant phase time Tφ with an efficiency that increases until reaching ηB for a flow rate of 70% of the nominal flow rate. In the example given, below 70% of the flow rate, a conventional regulation is returned to, that is to say that the phase time will be increased, but this will make it possible to maintain the maximum efficiency ηB and not the lower design efficiency ηA.

According to the design conditions, the point B may correspond to the case where the amount of elution gas originating from the production has been canceled or else to the case where the total flow rate of elution gas becomes too low to be able to ensure the purity desired for the production. Below that, the performance drops and offers no advantage.

It is advisable here to make a certain number of observations.

Moving over the curve AB is normally the optimum since advantage is completely taken of the overdesign which is converted into efficiency. It is of course possible to use an approach intermediate between the two regulations described by using only a fraction of the overdesign for the purpose of increasing the efficiency and of at the same time adjusting the purity of the production to the targeted purity via an increase in the phase time.

The potential gain in efficiency will depend on the point chosen for the design.

For an $H_2$-PSA, it may be several percent in the case of a moderate nominal efficiency—for example going from 86% to 88%—or several tenths of a percent in the case of an initial efficiency that is already very high, for example from 89.1% to 89.5%. It may however be observed that in the second case, it is generally a unit that produces large flow rates of hydrogen, more than 100 000 $Nm^3/h$, and that the supplementary production is counted in hundreds of $Nm^3/h$.

Conversely, when starting from a relatively low efficiency, it is possible to achieve very significant gains in efficiency (point C from FIG. 1).

Point D is placed as a matter of interest. It is generally possible to treat more feed gas than the nominal flow rate at the expense of a loss of efficiency. The regulation according to the invention, by adjusting the amount of elution gas, may also make it possible to find a better solution than the simple reduction of the phase time.

The feed gas flow rate, more particularly a reduction in the flow rate treated, has been selected as an operating parameter that makes it possible to provide a margin regarding the volume of adsorbent as the most direct example. It is understood that other parameters may have the same effect such as a low pressure below the nominal low pressure, which facilitates the regeneration. Likewise, it is possible to have a purer feed gas, a lower purity required for hydrogen, more favorable temperature or pressure conditions of the feed gas, etc. In these cases, the correction linked to the purity of the hydrogen will be at first generally a determining factor in the regulation since the variation of these operating parameters (pressures, composition, etc.) will not be able to be directly taken into account in the regulation. In practice, a drop in the regeneration pressure for example, at an unchanged feed flow rate, will result, in order to maintain the required purity, in treating slightly more flow rate, i.e. in increasing the phase time. This increase in phase time will then make it possible to reduce the elution by the production in order to return to the nominal phase time and by so doing increase the extraction efficiency.

It will be noted that in order not to disturb the production, it could be advantageous to draw off the adjustable fraction of elution gas withdrawn from said production in a continuous manner and with a constant flow rate. This fraction must therefore be withdrawn over one (or more) complete phase times.

In order to better explain the principle of the invention, the case of $H_2$-PSAs has been taken, which PSA process has probably known the most developments in recent years due to its success with various hydrogen-consuming industries.

This is understood to mean hydrogen having a purity of greater than 95 mol %, generally greater than 98 mol % and that may reach, when the consuming process requires it, purities of greater than 99.99%.

But the invention in its very principle may apply, a priori, to all PSA cycles in the most general sense since there is a relationship between the amount of elution gas, the productivity and the efficiency.

Thus, it is possible to envisage, for example, a PSA unit intended to strip the $CO_2$ from an oxygen blast furnace gas in order to recycle it while producing $CO_2$, at a purity sufficient to sequester it either directly, or after a supplementary treatment (coldbox, membrane, other adsorption unit, etc.).

The cycle of the $CO_2$-PSA may comprise supplementary steps such as a Rinse step which consists in circulating in co-current mode, in the adsorbent bed, a fraction of the $CO_2$ production at the pressure at the end of the last equalization in order to drive the lightest constituents (CO, $CH_4$, $H_2$, $N_2$) from the adsorbent inlet zone in order to subsequently recover, during the Blowdown (counter-current depressurization), an effluent highly enriched in $CO_2$. It will be noted that the $CO_2$ may also be extracted from the adsorber during the elution phase, or at least during part of this next step with the (optional) aid of a vacuum pump. It is thus possible to recover a gas containing more than 80 mol % of $CO_2$.

The gas recovered at the outlet during the Rinse step is used during a purge step P to push the $CO_2$ back toward the inlet end of the adsorber. The gas recovered at the purge outlet is discharged to outside of the unit or recycled in the feed gas.

More simply, it may be a question of stripping the $CO_2$ from a conventional (air combustion) blast furnace gas in order to reinject the $CO_2$-depleted gas into the blast furnace.

Among other applications of PSAs capable of using the regulation according to the invention, mention may be made, non-limitingly, of the production or purification of helium, the production of oxygen, the production or stripping of nitrogen, the separation of hydrocarbons, gas drying, etc.

The basic applications envisaged for PSAs according to the invention are preferably processing units of high flow rate, for example more than 100 000 $Nm^3/h$, with conventional adsorbents and standard valves. The phases—within the meaning of the definition given above—will have a duration preferably equal to 10 seconds and more, resulting in cycles having a duration of generally more than one minute and preferably of at least 2 minutes.

Nevertheless, the cycles according to the invention are also very suitable for the new adsorbent structures in the process of being developed.

The expression "new structures" is understood to mean structured adsorbents. The adsorbent is no longer in the form of millimetric particles (beads, rods, crushed materials, pellets, etc.) but has more complex geometries and sizes of several centimeters or even several tens of centimeters. They may be monoliths, parallel-passage contactors, a set of parallel fibers, adsorbent fabric, etc. The cycle times are then generally much shorter, of the order of several seconds or tens of seconds.

The invention claimed is:

1. A pressure swing adsorption process for producing a gas stream enriched in a compound X from a feed gas stream, the process comprising at least 2 adsorbers, each adsorber being subjected to a pressure cycle having a high pressure and a low pressure, the process comprising the following successive steps:
   a) adsorption at the high pressure with production of the gas stream enriched in compound X;
   b) depressurization to the low pressure;
   c) elution at the low pressure by means of an elution gas;
   d) repressurization to the high pressure
wherein:
   the elution gas comprises a fraction of a gas stream resulting from the depressurization of an adsorber and a fraction of the gas stream enriched in compound X,
   the fraction of the gas stream enriched in compound X is adjustable via an adjustment means, and
   the pressure cycle has a phase time corresponding to the duration of a pressure cycle divided by the number of adsorbers and the fraction of the gas stream enriched in compound X is determined as a function of the phase time.

2. The process claim 1, wherein the fraction of the gas stream enriched in compound X is adjusted as a function of at least one of the operating conditions of the pressure swing adsorption process.

3. The process of claim 2, wherein the operating conditions include the feed flow rate of the pressure swing adsorption process, the low pressure, the high pressure, the temperature of the feed stream, the composition of the gaseous feed stream and the required concentration of compound X in the enriched gas stream.

4. The process claim 1, wherein the adjustment means comprise an automatic valve.

5. The process of claim 4, wherein the automatic valve also performs another function in the pressure swing adsorption process cycle.

6. The process of claim 1, wherein the pressure cycle comprises from 1 to 6 equalizations.

7. The process of claim 1, wherein the depressurization step b) comprises several sub-steps and the fraction of the gas stream resulting from the depressurization is withdrawn at the same time as or at least partially with another sub-step.

8. The process of claim 1, wherein the fraction of the gas stream enriched in compound X is withdrawn throughout the duration of a phase time.

9. The process of claim 1, wherein the compound X is hydrogen or CO2.

10. A pressure swing adsorption process for producing a gas stream enriched in a compound X from a feed gas stream, the process comprising at least 2 adsorbers, each adsorber being subjected to a pressure cycle having a high pressure and a low pressure and comprising the following successive steps:
   a) adsorption at the high pressure with production of the gas stream enriched in compound X;
   b) depressurization to the low pressure;
   c) elution at the low pressure by means of an elution gas;
   d) repressurization to the high pressure
wherein:
   the elution gas comprises a fraction of a gas stream resulting from the depressurization of an adsorber and a fraction of the gas stream enriched in compound X,
   the fraction of the gas stream enriched in compound X is adjustable via an adjustment means, and
   the pressure cycle has a phase time corresponding to the duration of the pressure cycle divided by the number of adsorbers and the fraction of the gas stream enriched in compound X is selected so that the phase time corresponds to the nominal phase time ±5%, the nominal phase time corresponding to the phase time of the PSA under design conditions.

* * * * *